UNITED STATES PATENT OFFICE.

PETER C. D. CASTLE, OF ST. MARGARET'S-ON-THAMES, ENGLAND.

PRODUCT FOR USE IN TEXTILE AND OTHER MANUFACTURES.

1,063,118.     Specification of Letters Patent.     Patented May 27, 1913.

No Drawing.     Application filed September 27, 1912. Serial No. 722,688.

*To all whom it may concern:*

Be it known that I, PETER CAMERON DOUGLAS CASTLE, a subject of the King of Great Britain, residing at Derna, St. Peter's Road, St. Margaret's-on-Thames, in the county of Middlesex, England, have invented a new and useful Improved Product for Use in Textile and other Manufactures, of which the following is a specification.

My invention consists in a process for the extraction of gum or mucilage from the kernels of the locust bean. Its purpose is to effect such extraction more cheaply than has been possible hitherto, especially by dispensing almost entirely with the use of steam, and by avoiding the necessity for the filtration which is requisite in other processes.

In working my process I take the kernels either whole or split into two and steep them in a strong solution of caustic soda or of course caustic potash. The strength of solution used may be from 75 to 90 per cent., this and the time of steeping being varied according to the age, condition and origin of the kernels. For instance thin-husked kernels of the current year's crop may require from fifteen to thirty minutes steeping in a solution of 75-80%; by the end of that time the husk begins to rise from the kernel or at least gets to such a condition that it can readily be rubbed off. Older kernels require a stronger solution or a longer time, and so do the thick-husked kernels which are characteristic of some localities. If the solution is too strong it will be found that the edges of the kernel blacken. The hard husk of the kernel is detached from the gummy parts in pieces and easily washed away with water. The de-husked kernels are then washed in a solution of borax the strength of which is one per cent. or less, being varied together with the time of washing according to needs and the purpose for which the resulting product is required. The washing never needs to exceed a minute or two; and the borax should be strong enough to produce a whitish yellow coloration in the edges of the cotyledons in place of their normal dark tint; but if it is a little stronger than necessary no harm is done. When this solution is washed away the kernels are in a friable condition and easily ground into flour by a coffee mill or similar machine constructed to grind very small. This flour is then washed in either warm (not hot) or cold water containing a weak saccharine solution—a solution of cheap honey for instance or a solution of glucose—being stirred for twenty or thirty seconds for a small quantity, or for from one to two minutes if the quantity is as large as can be conveniently treated at one time. On being allowed to stand the flour falls to the bottom in the form of a thick paste which may contain from three up to eight or ten per cent. of dry gum. This paste is ready to be put in casks and when it contains five per cent. of the dry gum it will remain good for months without the addition of any antiseptic. The paste product dissolves in water when heated just like starches and while it is not identical with tragasol, it has similar properties and distinct uses of its own. By variation of the process, *e. g.* strengths of solutions and duration of steeping as previously indicated, the product becomes identical in properties with gum tragacanth.

The solutions may be reckoned on either the solid salt or a concentrated solution; for instance the 1% borax solution may contain one lb. of borax to one hundred lbs. of water, or one lb. of concentrated borax solution to one hundred pounds of water. It is obvious that the figures given are not to be considered as precise; the reason being that the circumstances arising in actual work must be allowed for. For instance kernels of a given age from a specified locality will vary from season to season; the crop of a fine hot year requiring a stronger solution of caustic than the product of a wetter season. In practice until sufficient experience has been accumulated a sample of each consignment should be treated in the laboratory to ascertain the precise treatment which secures the best results.

The process is applicable to the wild as well as to the cultivated varieties of locust bean.

What I claim is:

1. A method of preparing gum or mucilage from locust bean kernels which consists in treating the kernels with caustic alkali having a strength of 75 to 90 per cent. for a period of time not exceeding approximately thirty minutes, washing the dehusked kernels in a solution of borax having a strength of approximately one per cent., grinding them to powder and then treating with a saccharine solution.

2. A method of extracting gum or mucilage from locust bean kernels, consisting in dehusking the kernels, washing the dehusked kernels in borax solution having a strength of approximately one per cent. or less, grinding them to powder, and treating the flour with a saccharine solution.

In testimony whereof I have signed my name to this specification in the presence of two subscribing witnesses.

P. C. D. CASTLE.

Witnesses:
 A. E. ODELL,
 LEONARD E. HAYNES.